United States Patent [19]

Whetstone et al.

[11] 3,838,212

[45] Sept. 24, 1974

[54] GRAPHICAL DATA DEVICE

[75] Inventors: Albert L. Whetstone, Southport, Conn.; Samuel Fine, New City, N.Y.; William Banks, Fairfield; Stanley C. Phillips, Trumbull, both of Conn.

[73] Assignee: Amperex Electronic Corporation, Hicksville, Long Island, N.Y.

[22] Filed: July 11, 1969

[21] Appl. No.: 841,058

[52] U.S. Cl. .................................................. 179/18

[51] Int. Cl. ............................................. G08c 21/00

[58] Field of Search...... 178/18, 19, 20; 340/12 AR, 340/12 C, 16

[56] References Cited

UNITED STATES PATENTS

| | | | |
|---|---|---|---|
| 2,648,056 | 8/1953 | Jakosky | 340/12 |
| 3,134,099 | 5/1964 | Woo | 178/18 |
| 3,156,766 | 11/1969 | Stamps | 178/18 |
| 3,176,263 | 3/1965 | Douglas | 340/16 |
| 3,439,317 | 4/1969 | Miller et al. | 178/18 |
| 3,535,447 | 10/1970 | Wollrich | 178/18 |

OTHER PUBLICATIONS

IBM Technical Disclosure Bulletin, Vol. 12, No. 3, August 1969, "Acoustical Data Input Panel".

*Primary Examiner*—Kathleen H. Claffy
*Assistant Examiner*—Thomas D'Amico

[57] ABSTRACT

A graphical data device employing a stylus moving over an area to be digitized and utilizing a fast rise time sound energy shock wave, generated by a spark at the location of the stylus and propagated through the air for providing coordinate information as to the instantaneous position of the spark. Receiver devices are positioned along X and Y coordinates and respond to the leading edge of the air propagated shock wave front to provide an elapsed time indication from the moment of spark generation to the moment of shock wave reception. In a further embodiment, a three dimensional configuration is employed, utilizing a three coordinate receiver.

12 Claims, 6 Drawing Figures

INVENTORS.
ALBERT L. WHETSTONE
SAMUEL FINE
WILLIAM BANKS
STANLEY C. PHILLIPS
BY [signature]
AGENT INVENTORS.
ALBERT L. WHETSTONE
SAMUEL FINE
WILLIAM BANKS
STANLEY C. PHILLIPS
BY Frank R. Trifari
AGENT INVENTORS.
ALBERT L. WHETSTONE
SAMUEL FINE
WILLIAM BANKS
STANLEY C. PHILLIPS
BY Frank R. Trifari AGENT

GRAPHICAL DATA DEVICE

This invention relates to a graphical data device and more particularly to a mechanism for digitizing the position of a stylus with respect to a fixed set of reference coordinates.

Graphical data devices are commonly employed in such areas as facsimile transmission and in computer data input devices. The earlier forms of such devices employed a stylus in the form of a writing pen or pointer mechanically coupled to a set of arms for translating the movement of the stylus into a sequence of usable information signals. Such arrangements are unsatisfactory in that they present undesirable frictional and inertial limitations. The use of induction pick up devices have also been attempted, but with difficulty due to noise generated by stray fields and other undesired interference. Sheet resistance material has been employed to provide an X/Y coordinate indication but has presented resolution and uniformity problems giving rise to erroneous information. Other attempts include designing a tablet in the form of a laminated matrix of X and Y conductors, the movement of the stylus thereon providing a continuous coordinate reading of stylus position. Such systems are extremely uneconomical in view of the expense of the tablet construction and in view of the extensive electronics necessary to interpret the coordinate information provided. Light pen systems require interaction with cathode ray tube display screens and are limited in usefulness. Attempts at employing sonic transducer coordinate devices result in requiring some form of acoustic transmission plate in contact with a vibrating stylus and is functionally limited in that the stylus must make direct contact with the acoustic transmission medium (usually a glass plate) without the intervention of a damping medium such as a sheet of paper. Also, the need for tuned crystal pickups acoustically coupled through the glass plate requires extensive construction and expensive components. All of the forgoing systems suffer from the further limitation of being capable of creating data only upon a one or two dimensional plane.

In the system of the present invention, the graphical data device may be multi dimensional, containing one, two, three or more coordinate reference positions, and containing a data surface within the defining coordinates. The device operates by employing atmospherically transmissible signals corresponding to the position of the stylus with respect to the dimensional reference points. The advantage of an atmospherically transmissible signal is significant in that it relieves the graphical device from the problems of non-uniformities in a transmitting surface and that in enables three dimensional digitizing, whereas the prior systems are all of necessity limited to the two dimenisonal surface area. In the preferred embodiment, the transmitted signal is a fast rise time sound pulse which is generated by a low energy discharge in the form of a spark generated at or near the tip of the stylus. The use of the spark as the signal generating medium is specifically advantageous as will be more apparent in the later following detailed description. The receiver units are microphones, preferably capacitive, mounted at suitable positions corresponding to the desired dimensional references. The spark may be periodically generated at various rates. Each microphone is coupled to a data digitizer which senses the time duration between each spark generation and reception at a respective microphone, and provides a data signal representative of such duration. The duration is a measure of the various elapsed times taken by the sound shock wave along the respective coordinate axes to an appropriate receiver and thereby an effective indication of the position of the stylus with respect to the reference dimensions.

The microphone is in preferred form a capacitive bar microphone having a substantially uniform response characteristic. The sparks are triggered by a capacitive discharge circuit employing a series of capacitors to build up potential energy level sufficient to create the desired spark.

In the three dimensional form of the invention, each microphone is arranged along an appropriate axis and in the form of a sheet encompassing the desired area. Each microphone is provided with a digitizing channel. In this manner a three dimensional object or pattern could be digitized.

The data of the graphic device can be fed to a computer memory for temporary or permanent storage and retrieval when desired. By storing, and later retrieving, the image can be recalled for display on a suitable cathode ray tube device. The data can also be fed directly to a display device by conversion of the digitized signals to analog magnitudes and displayed as a continuous series of signals on the face of a cathode ray tube display.

It is therefore an object of the present invention to provide an improved graphical data device.

It is another object of this invention to provide a graphical data device employing atmospherically transmissible signals.

It is a still further object of the invention to provide a graphical data device employing an atmospherically transmissible fast rise time sound pulse created by a low energy electrical discharge in the form of a spark at or near the tip of the stylus.

It is a still further object of the invention to provide a graphical data device having high accuracy, reliability and with a degree of economy heretofore unattainable.

The forgoing objects and brief description as well as further objects and features of the invention will become more apparent from the following specification and the appended drawings, wherein:

FIG. 1 is a block diagram generally illustrative of the invention;

FIG. 1A a detail of the microphone of FIG. 1;

Figures 1, 1A, 2:
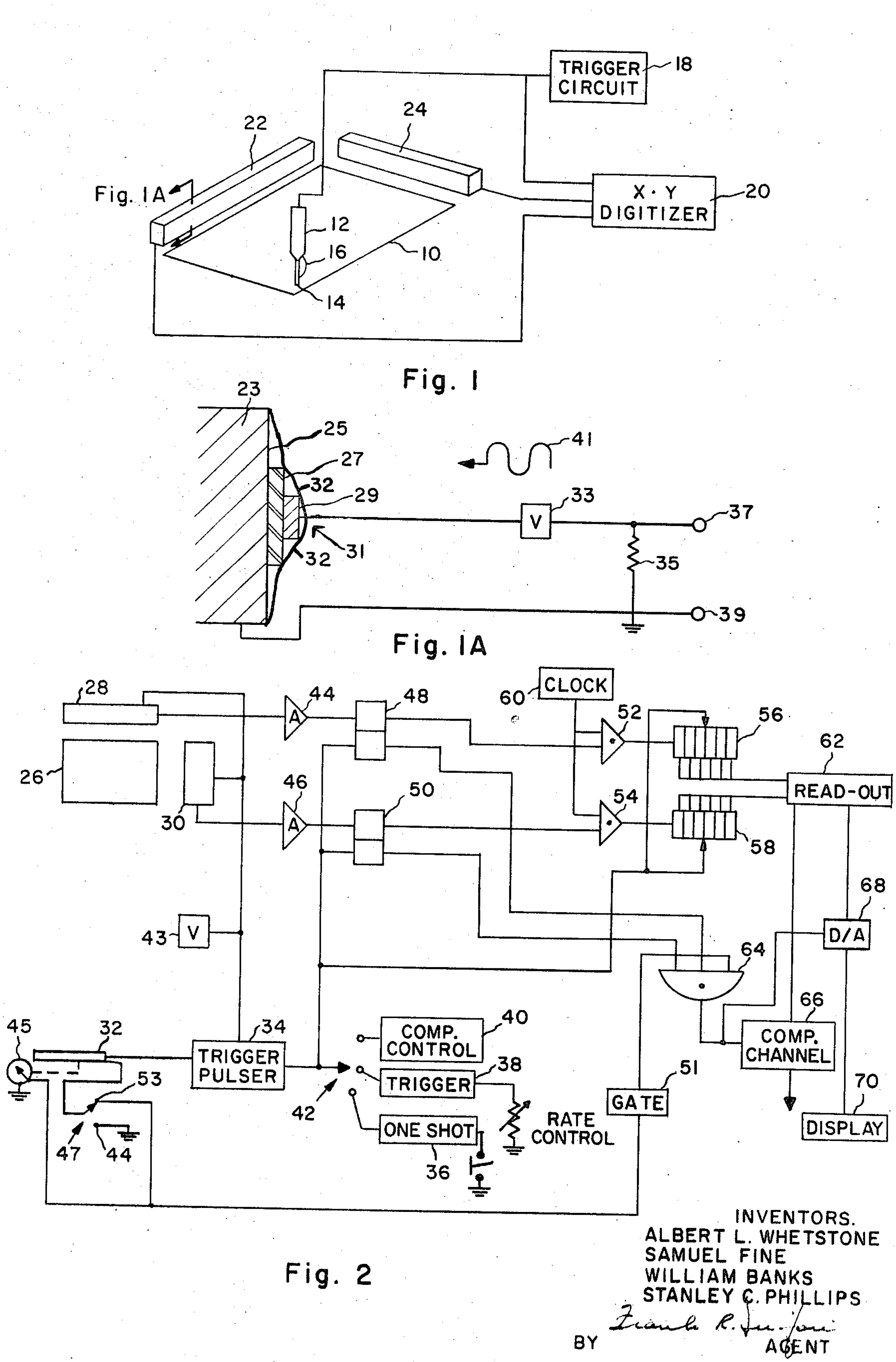
FIG. 2 is a more detailed schematic illustrating the two dimensional graphical digitizer.

Referring to FIG. 1, the surface area 10 is shown as a definable bounded surface for ease of illustration. The surface is supportive only and performs no actual function within the operation of the graphical data device of this invention. As a practical matter, the surface 10 can be a glass sheet, firm enough to support a document for writing purposes, and sufficiently transparent to enable tracings to be made. A stylus 12 is movable over the surface area 10 and is preferably cartridge in form. The stylus 12 can be provided with a writing tip 14 which may for example be a conventional ball-point pen cartridge, and includes an electrode set 16 having a gap for producing a suitable electrical discharge in the form of a spark. The spark itself is constituted by a sudden discontinuous discharge of electricity, as through air, and thereby producing a fast rise time sound pulse or wave radiating away from the point of discharge. The spark electrodes may be conventional electrical conductors separated by a gap of sufficient spacing to produce a spark when suitably triggered by a voltage of sufficient magnitude, as will be described in further detail below.

The stylus spark is triggered by means of a trigger circuit 18, which latter also provides a trigger timing pulse to the X + Y digitizer. The shock wave created by the spark at the tip 16 of the stylus 12 will propagate through the atmosphere until contacting the microphone 22 and 24. Since the propagation through air of the sound wave front created by the spark will reach the respective microphones at the closest perpendicular distance from the sound source, the time duration of transit will be a measure of position of the stylus with respect to the microphones. Each microphone is coextensive with the operative area 10 and defines its dimensions. The elapsed time duration is digitized in the digitizer 20 which begins digitization in accordance with the initial trigger pulse and ends digitization, on a coordinate or channel by channel basis, upon receipt of the leading edge of a wave front at the microphones 22 or 24. The spark signal may be a single spark for a single point digitization or a controlled rate of repetitive sparks for a series of coordinate digitizations. The latter is effective for storing written images and the like which are definable as a series of points. By increasing the spark repetition rate, extremely high resolution can be obtained.

The stylus may be provided with a manually operative switch or a writing pressure switch. The operation of this switch can serve several alternative functions. In a first function, the switch can couple single pulses to the electrode for each switch activation. In this function, only a single digitization point will be produced for each point of contact between stylus and surface. In an alternative switching mode, the switch can provide continuous digitization of the stylus position while permitting readout of digitization only when the stylus is in contact with the data surface. The former mode is particularly advantageous where straight line drawings are made, as the stylus will digitize end points and a storage readout device can provide a connecting line. The latter mode is particularly useful in the digitization of drawings or graphic designs, particularly in adaptive or self corrective types of displays. The position of the stylus is continually digitized whether on or off the writing surface. Utilizing this feature, a storage screen or display may continually display the position of the stylus without permanently storing same so that the operator can precisely locate pre-stored positions on the screen without the necessity of continually probing the writing surface. This feature is particularly valuable because the data surface need not be maintained in a precise position at all times since the stylus position is always ascertainable above the surface as well as on it. Similarly, by moving the stylus beyond the receiving range of the microphones, an overload condition is created which can be utilized to indicate an end of transmission.

The microphone units may be any form of acoustic transducer constructed so as to produce a substantially uniform magnitude output pulse in response to the incidence at any point along the microphone length of a sound shock wave front. A preferred form of microphone structure is indicated at FIG. 1A, showing a cross-sectional view of a microphone used in FIG. 1 and as shown therein is constructed of a bar length of any type of metallic base structure 23 such as aluminum. A layer of insulating polyester film 27 such as mylar is mounted to the surface 25. A metal layer 29 such as copper is mounted to the insulating film 27. A final layer of a polyester film 31 such as mylar, metalized on the external surface, is affixed to the base structure 23 and encloses the conductor insulator sandwich. A high voltage source of, for example, 500 volts is coupled to one of the layers 29, and through a limiting resistance 35 to the base portion 23 and the metallized film 31. The output is taken across the resistance 35 via terminals 37 and 39. In operation, a sound wave 41 approaching the surface of the metallized film 31 causes movement of the film 31 relative to the metal layer 29 particularly within the sensitive region 32. Since the capacitive effect is directly dependent upon the spacing between layers 29 and 31, the movement will have the effect of varying the capacitance and therefore the output across terminals 37 and 39. If the microphone is operated at constant Q, then in accordance with the standard relationship for a capacitor:
the output voltage will be a direct function of the capacitance change.

Referring now to FIG 2, the two dimensional graphical data device is shown. The data surface 26 is bordered by X and Y microphones 28 and 30. The stylus 32 is triggered by a trigger pulser 34 which is any form of conventional trigger generator. Both microphones and trigger pulser is powered by a voltage source 43. For low energy level sparks the generator can store an energy level of, for example, $10^{-3}$ joules for subsequent discharge through the spark gap. The energy produced can be higher but the level thereof should be controlled by safety factors. The trigger pulses can be energized any number of ways, including a one-shot trigger 36 for producing single sparks and which may be manually controlled, a rate variable free running trigger oscillator 38 for producing a series of spark pulses, and a computer input 40 which enables spark generation to be controlled externally. The one-shot 36 and free running oscillator 38 may be of a conventional variety. The computer control terminal 40 can be from any externally applied means for generating trigger signals as desired. A mode selection switch 42 couples the desired input to the trigger pulser.

The X-Y microphones 28 and 30 are respectively coupled to high gain band pass amplifiers 44 and 46. Since the spark shock wave produces a fast rise time electrical impulse upon impinging on the microphone, the band pass amplifiers will allow only the fast rise time portion of the electrical pulse to pass while blocking out all noise signals outside the band. To insure rapid operation, the amplifiers include threshold discriminators which provide an output pulse with steep leading edges in response to the input thereto exceeding a predetermined level.

The output of the respective amplifiers 44 and 46 are coupled to the respective inputs of a conventional bistable flip-flop network 48 and 50. One output of each flip-flop is gated through gates 52 and 54 into X-channel and Y-channel counters or scalers 56 and 58. The gates 52 and 54 respectively receive a clock input from a clock pulse generator 60. The counter outputs are coupled to a readout unit 62 which may be any conventional form of interim storage device or transfer register.

Figure 3:
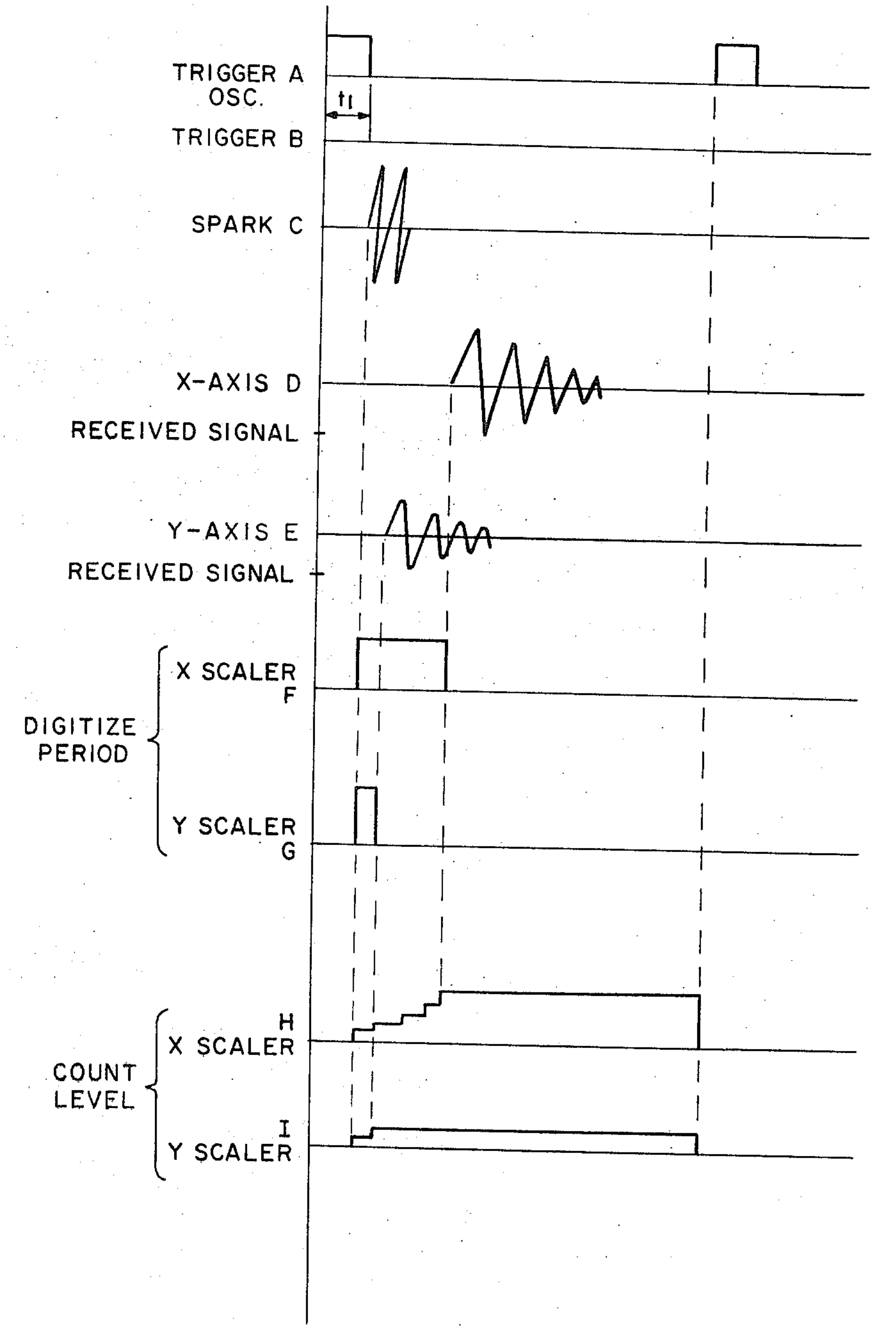
FIG. 3 illustrates the waveform relationships of the invention as shown in FIG. 2.

The external source initiation of a trigger signal passing through the switch 42 (FIG. 3A) acts to trigger a pulse from pulser 34 (FIG. 3B) and initiate a spark (FIG. 3C). The trigger signal is also conducted simultaneously to each of the flip-flops 48 and 50 and acts to reset the scalers 56 and 58. The effect of the trigger signal on flip-flops 48 and 50 is to set each flip-flop in a state permitting the AND gates 52 and 54 coupled thereto to pass clock pulses from the clock source 60. The scalers each begin to accumulate a digital count (FIGS. 3F and 3G; FIGS. 3H and 3I). The count continues to accumulate until an appropriate signal is received at the microphone units 28 and 30 (FIGS. 3D and 3E). The leading edge of the respective coordinate signal received acts to reset the state of the appropriate flip-flop 48 or 50 and thereby block the AND gate 52 and 54 coupled thereto; holding the flow of clock pulses and ceasing the scaler accumulation. The period between trigger pulses in sufficient to allow the received signals to damp out. The scaler reset operation is effected on the leading edge of the trigger pulse (FIG. 3A) and the unblocking of the AND gates on the trailing edge. The trigger pulse has a duration of $t_1$ and thus results in creating a "dead space" or margin at a distance from each microphone of a distance equal to the ratio of the time $t_1$ to the velocity of sound in air. Thus, for example, if the reset pulse duration is 40 microseconds, and the speed of sound in air is 75 microseconds per inch, the effective margin area is approximately one-half inch.

The complimentary outputs of flip-flops 48 and 50 are respectively coupled to an additional AND gate 64. This latter gate is coincidently energized only during the period after the count accumulation is complete but before the reset period when both flip-flops 48 and 50 are in the reset state. This provides a "data ready" indication which can be utilized for transferring the accumulated count to an appropriate output.

As shown, the gate 64 can energize a computer channel 66 which can receive the data from the readout unit 62, or a digital to analog conversion unit 68 which can convert the digitization to a series of analog voltages for display on a cathode ray screen 70. The latter can be a storage unit, thereby allowing continuous readout and permanent screen storage for observation.

A pressure switch 45 contained within the stylus 32 can be arranged so as to cause several varied operations. For example, a mode switch is provided and sets the stylus spark electrodes for receiving trigger pulse, from pulser 34, in two modes. A first position 49 connects the pulses to the electrodes continuously. Thus, a continuous digitization of the spark is provided regardless of whether the stylus is on or off the data surface. Readout of digitization however does not occur until pressure switch 45 is activated, thereby allowing gate 64 to become unblocked by virtue of activation of a gate source 51. In the second mode, switch 47 is in position 53. In this position, both sparking and readout only occur when the pressure switch 45 is activated.

Figure 4:
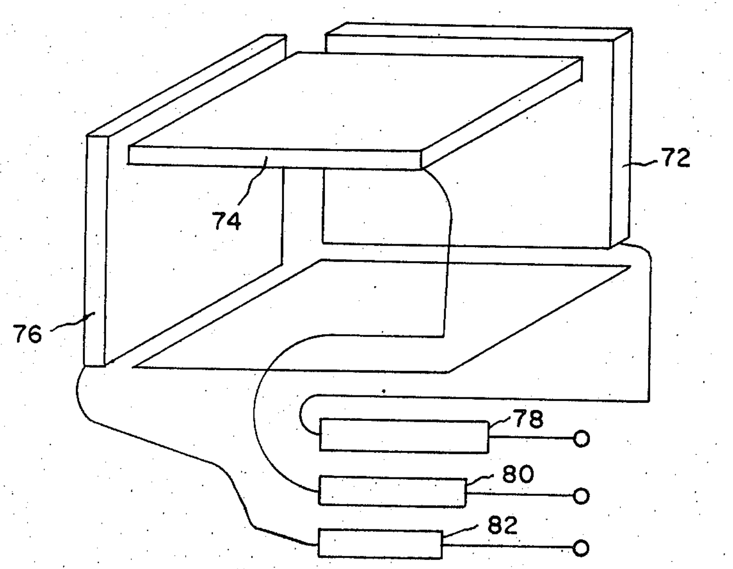
FIG. 4 illustrates a three dimensional embodiment of the invention.

Referring to FIG. 4, another embodiment is illustrated wherein the invention is employed for digitizing in three dimensions. Here, three microphones, 72, 74, 76 are positioned about a three dimensional space area. The microphones are constructed as sheets with a surface area sufficient to encompass the desired dimension. A spark generated at any point within the confines of the operative area will result in a three point digitization of the elapsed time from spark generation to reception by each respective microphone 72, 74, 76 and its associated channel electronics 78, 80, 82. The channel 78, 80, 82 units may operate in precisely the manner described in connection with the two dimensional embodiment shown in FIG. 2. Multi dimensional analysis employing more than three microphones can also be accomplished, as will be evident to those skilled in the art.

Figure 5:
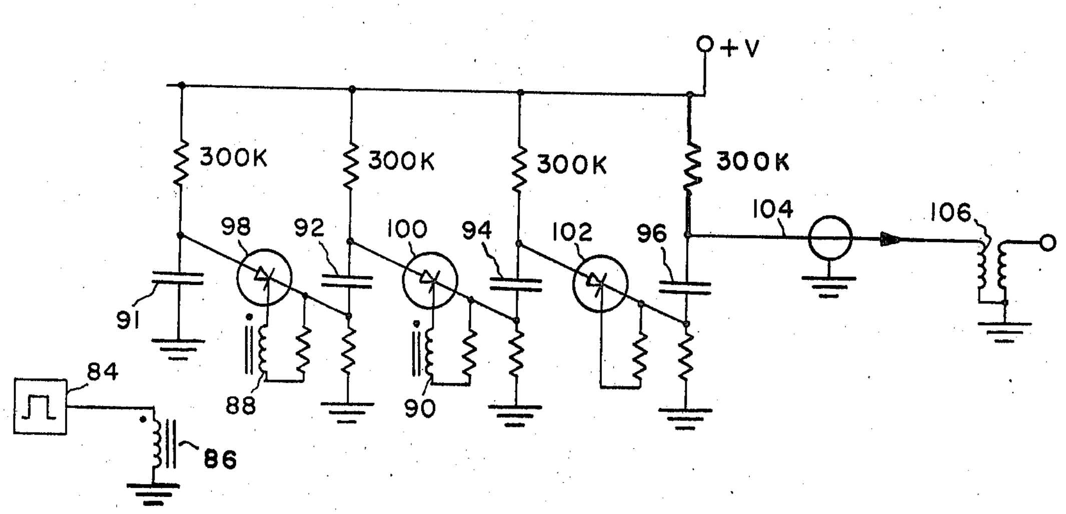
FIG. 5 illustrates one form of trigger circuitry which is employed in the present invention.

Referring to FIG 5, a preferred form of the trigger circuitry is illustrated for providing a voltage magnitude sufficient for a spark generation.

A source of pulses 84 supplies a transformer primary 86 coupling pulses through to secondaries 88 and 90. The network itself consists of a series of capacitors 91, 92, 94, 96, each series connected between pairs of resistors, excepting capacitor 91, which is connected between a resistor and ground. A source of voltage $+ v$, of for example 500 volts, is coupled to each line. Each line is connected to an adjacent line by a thyristor 98, 100, 102. The last capacitor 96 is coupled through a cable 104 to a saturable transformer 106, and from there to the stylus electrodes.

In operation, each of the thyristors are non-conducting and each capacitor is charged up to + V. The appearance of a pulse from the source 84 will, through transformer action, switch the thyristor 98 by applying a positive potential to the gate electrode, thereby rendering the thyristor conductive. The flow through thyristor 98 clamps the lower plate of capacitor 92 at + V, thereby driving the upper plate to V + V or 2V. The thyristor 100, also rendered conductive, clamps the lower plate of capacitor 94 at + 2V, thereby driving the upper plate 2V + V or 3V. A transformer secondary could also be employed at the last thyristor 102, however by proper designing of potentials, the last thyristor can self saturate due to the forward impression thereon of a 3V potential difference. With a 500 volt source, and utilizing thyristors type 2N4443, that situation will occur.

The final voltage across capacitor 96 is conducted along the cable 104 and through a step up transformer 106. The transformer 106 is preferably of the saturable core type and guards against excessive overloading at the spark generating electrode, thereby providing a degree of safety factor.

since certain changes and modifications can be readily entered into in the practice of the present invention without departing substantially from its intended spirit or scope, it is to be fully understood that all of the foregoing description and specification be interpreted and construed as being merely illustrative of the invention and in no sense or manner as being limiting or restrictive thereof.

What is claimed is:

1. A graphical data device comprising a data area having one or more dimensions within defined coordinates, a stylus movable anywhere along said area within said defined coordinates, means corresponding to the position of said stylus on said area for generating an atmospherically transmissible sound signal at said position, said device further including a receiving means positioned along a defined coordinate and corresponding to each one of said dimensions for responding to the atmospheric transmission characteristic of said sound signal by sensing the wave front of said sound signal, means coupled to each of said receiving means for sensing the time duration between generation of said signal and reception of the atmospheric transmission of said sound wave front signal by each of said receicing means, and means for converting each time duration into a data signal.

2. A graphical data device comprising a data surface having a plurality of dimensions, a stylus movable in the general region of said surface defined by said dimensions, first means including a portion of said stylus for generating a spark discharge at the stylus location, said discharge producing an atmospheric sound wave, a plurality of microphones receptive to the atmospheric propogation of said sound wave emanating from said portion of said stylus and orthogonally incident to said microphones for producing an electric signal in response thereto, each of said microphones positioned along a mutually perpendicular dimension of said data surface, second means coupled to said first means and to each of said microphones for sensing the time duration between generation of said spark discharge and reception by each of said microphones of the leading edge of said sound wave generated by said spark discharge, and third means for converting each time duration into a data signal representing the position of the stylus location at the moment of discharge.

3. The combination of claim 2 wherein said plurality of microphones includes three microphones, each of said microphones occupying mutually perpendicular axis, and each encompassing an area for totally defining a cubic surface.

4. The combination of claim 2 wherein said first means includes a source of spark generating trigger pulses, means for initiating said trigger pulses, and an electrode set positioned adjacent the tip of said stylus and responsive to each said trigger pulse to generate a spark.

5. The combination of claim 4 wherein said source of trigger pulses comprises a plurality of capacitors, each of said capacitors coupled to a source of D.C. voltage, a plurality of thyristors, each of said thyristors coupling the high energy level side of each capacitor to the low energy level side of the next successive capacitor, means for triggering each of said thyristors to permit a potential build up to occur from capacitor to capacitor, and means for coupling the highest energy level capacitor of said plurality to said electrode set.

6. The combination of claim 5 wherein said means for coupling includes a saturable core step-up transformer.

7. The combination of claim 4 wherein said second means includes a bistable circuit coupled to each microphone, each said bistable circuit having a first condition in response to generation of a spark, and a second condition in response to said reception at a microphone, said third means including a counter coupled to each bistable circuit, a source of counting signals, gating means responsive to said first condition of a bistable circuit for permitting the associated counter to accumulate a count and responsive to said second condition for stopping the said counter accumulation.

8. The combination of claim 7 including further gating means responsive to said second condition in all of said bistable circuit to provide a gating signal permitting the readout of said counters.

9. The combination of claim 8 wherein said further gating means includes an additional input, said stylus including a pressure switch, means coupling said pressure switch to said additional input whereby readout will occur only when said pressure switch is activated.

10. The combination of claim 9 further including a mode switch having a first position contact, means coupling said first position contact to said stylus pressure switch for permitting trigger pulses to generate said spark in response to presusre activation of said switch, and a second position contact, said second position contact permitting trigger pulses to bypass said pressure switch and continually generate sparks regardless of the activation of said pressure switch.

11. A graphical data device comprising a data surface, a stylus movable on said surface, an electrode set connected to said stylus and having a spark gap, a source of trigger pulses connected to said electrode set for forming a spark in said gap, a set of coordinate microphones, each of said microphones positioned along a mutually perpendicular dimension of said data surface and each producing an electrical signal in response to impingement thereon of the shock wave created by said spark, means for energizing a trigger pulse for generating a spark, a plurality of digital accumulating means, each said digital accumulating means responsive to said means for energizing to begin accumulation, logic means coupled to each of said microphones and to each of said accumulators and responsive to receipt of said electrical signal for terminating said digital accumulation in each of said accumulating means corresponding to each microphone producing said electrical signal, and means coupled to said logic means and responsive to said termination for reading out the stored accumulation in said digital accumulators.

12. The combination of claim 11 wherein said set of coordinate microphones includes three microphones, each of said microphones occupying mutually perpendicular axis, and each constructed in the form of a sheet.

* * * * *